United States Patent
Lim et al.

(10) Patent No.: US 9,219,662 B2
(45) Date of Patent: Dec. 22, 2015

(54) METHOD FOR APPLICATION EXTENSION AND IMAGE DISPLAY APPARATUS USING SAME

(75) Inventors: Sangyong Lim, Pyeongtaek-si (KR); Hojun Nam, Pyeongtaek-si (KR); Gyuseung Kim, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 224 days.

(21) Appl. No.: 13/808,434

(22) PCT Filed: Dec. 23, 2010

(86) PCT No.: PCT/KR2010/009280
§ 371 (c)(1), (2), (4) Date: Jan. 4, 2013

(87) PCT Pub. No.: WO2012/005421
PCT Pub. Date: Jan. 12, 2012

(65) Prior Publication Data
US 2013/0111023 A1 May 2, 2013

(30) Foreign Application Priority Data

Jul. 6, 2010 (KR) ........................ 10-2010-0064900

(51) Int. Cl.
*H04L 12/26* (2006.01)
*H04N 21/41* (2011.01)
*H04N 5/765* (2006.01)
*G09G 5/00* (2006.01)
*H04W 8/00* (2009.01)

(52) U.S. Cl.
CPC ................ *H04L 43/00* (2013.01); *G09G 5/003* (2013.01); *H04N 5/765* (2013.01); *H04N 21/4122* (2013.01); *G09G 2370/04* (2013.01); *H04W 8/005* (2013.01)

(58) Field of Classification Search
USPC .................................. 709/224, 200; 717/168
See application file for complete search history.

(56) References Cited

U.S. PATENT DOCUMENTS

| | | |
|---|---|---|
| 2002/0087746 A1 | 7/2002 | Ludtke et al. |
| 2005/0079819 A1 | 4/2005 | Tsutsui |
| 2006/0161955 A1 | 7/2006 | Newton et al. |
| 2007/0220009 A1* | 9/2007 | Morris et al. ................... 707/10 |
| 2008/0109826 A1* | 5/2008 | Akiyama et al. ............. 719/318 |
| 2008/0126929 A1 | 5/2008 | Bykov |
| 2009/0083732 A1 | 3/2009 | Shen et al. |
| 2009/0113417 A1 | 4/2009 | Vrijsen |

FOREIGN PATENT DOCUMENTS

| | | |
|---|---|---|
| KR | 10-2006-0028478 A | 3/2006 |
| KR | 10-2007-0120980 A | 12/2007 |
| KR | 10-2010-0074149 A | 7/2010 |

* cited by examiner

*Primary Examiner* — El Hadji Sall
(74) *Attorney, Agent, or Firm* — Birch, Stewart, Kolasch & Birch, LLP

(57) ABSTRACT

The present invention relates to a method for application extension and to an image display apparatus using same, and more particularly, to a method for application extension wherein an application is executed by using the application data after receiving the same in a device registered in an image display apparatus, and to an image display device using the method.

15 Claims, 16 Drawing Sheets

FIG. 3

| Application | User Interface Device (UID) | Network Information |
|---|---|---|
| APP 1 | DV1, DV10 | 101.455.711.80 ⋯ |
|  | DV10 | 43.14.75.90 ⋯ |
| APP 2 | DV2 | 10.23.45 ⋯ |
| APP 3 | DV3 | 10.75.89 ⋯ |
| APP 4 | DV4 | 3041.95.85 ⋯ |
| ⋮ | ⋮ | ⋮ |

## METHOD FOR APPLICATION EXTENSION AND IMAGE DISPLAY APPARATUS USING SAME

TECHNICAL FIELD

The present invention relates to a method for application extension and image display apparatus using the same, and more particularly to a method for application extension wherein an application is executed by using the application data after receiving the same in a device registered in an image display apparatus, and to an image display apparatus using the method.

BACKGROUND ART

An image display apparatus is a device equipped with a function of displaying images that a user can view. The user can view broadcasting through the image display apparatus. The image display apparatus displays broadcasting that is selected by the user from the broadcast signals transmitted out of a broadcast station. Current broadcasting is changing from analog to digital broadcasting over the world.

The digital broadcasting is broadcasting that transmits digital video and audio signals. Compared to the analog broadcasting, the digital broadcasting has less data loss due to the strength in external noises, has advantages in correcting errors, has high resolution, and provides clear images. In addition, unlike the analog broadcasting, the digital broadcast can provide a bi-directional service.

The conventional image display apparatuses are required to install an additional hardware to use high-capability applications, or as the conventional image display apparatuses can operate the applications only if the hardware has the high capability, it has been problematic that additional costs and resources for the image display apparatuses are needed.

For example, if the conventional image display apparatus uses an application using Global Positioning System (GPS) information, it is disadvantageous that additional costs and resources are required because the GPS should be additionally inserted in the image display apparatus.

Accordingly, it is highly demanded to develop a method of application extension and an image display apparatus using the method so that the problems of the conventional image display apparatus can be solved and high-capability applications can be used without installing additional hardware.

DISCLOSURE

Technical Problem

An object of the present invention is to provide a method of application extension of an image display apparatus and the image display apparatus using the same without installing additional hardware such that high-capability applications can be utilized by solving the problems of the conventional image display apparatus.

Also, another object of the present invention is to provide a method of application extension of an image display apparatus and the image display apparatus using the same such that diverse applications can be utilized and high-cost and high-capability applications can be utilized in the image display apparatus by installing simple device-linking applications in the image display apparatus without installing additional hardware.

Technical Solution

According to an embodiment of the present invention, a method for application extension of an image display apparatus comprises determining whether a device registered in an application is detected; if the device is detected, requesting application data to the detected device and receiving the application data; and executing the application using the received application data.

Also, according to an embodiment of the present invention, an image display apparatus comprises an external device interface unit configured to determine whether a device registered in an application is detected, if the device is detected, request application data from the detected device, and receive the application data; a control unit configured to execute the application using the received application data.

Advantageous Effects

The present invention has effect that high-capability applications can be utilized without being equipped with additional high-capability hardware in an image display apparatus.

In addition, the present invention has effect that diverse applications can be utilized and high-cost and high-capability applications can be utilized in the image display apparatus by installing simple device-linking applications in the image display apparatus without installing additional hardware.

DESCRIPTION OF DRAWINGS

FIG. 3 shows a drawing for storing device information corresponding to each application in an image display apparatus according to an embodiment of the present invention;

BEST MODE

In the following, with reference to the drawings, a method of application extension and an image apparatus using the method will be further described.

In the following description, the ending words for the configured elements such as "module" and "unit" are simply used for easier explanation purposes and they themselves do not have special meanings or roles. Thus, the words, "module" and "unit", can be interchangeably used.

On the other hand, as an intelligent image display apparatus adding a computer support function to a broadcast receiving function, the image display apparatus illustrated in the present invention can be equipped with more convenient interfaces for use such as a pen-inputting device, touch screen and space remote control by adding an internet function while functioning suitably as a broadcast receiver. And, by wired or wireless internet functions in support, functions such as email, web-browsing, banking and game can be performed. The standard general purpose OS can be used for these diverse functions.

That is, as the image display apparatus illustrated in the present invention can freely add or delete diverse applications in the general purpose OS kernel, diverse user friendly functions can be performed. For instance, it can be a smart TV.

Figure 1:
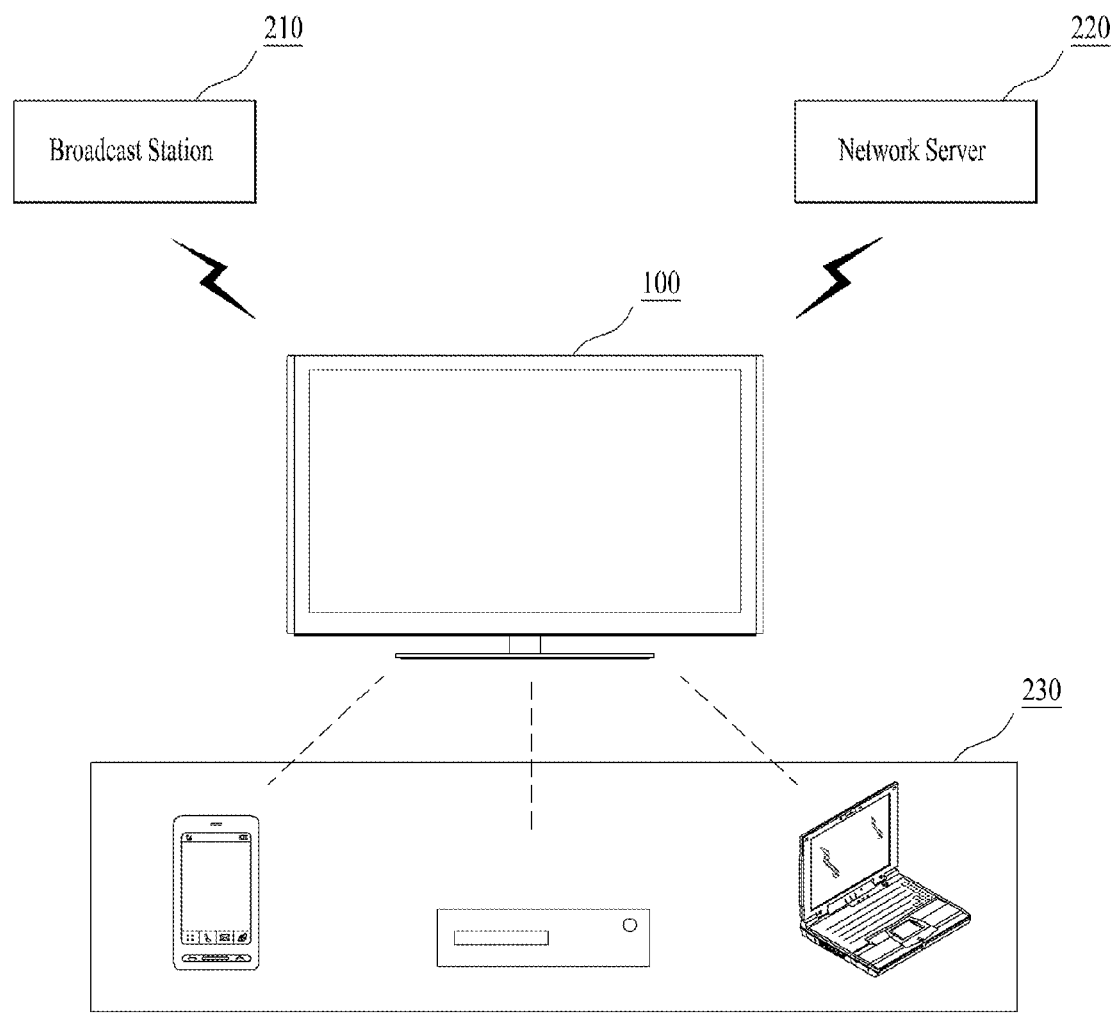
FIG. 1 shows a drawing of a plausible system for data transmission/reception with an image display apparatus of the present invention.

FIG. 1 shows a drawing of a plausible device for data transmission/reception with the image display apparatus of the present invention.

Referring to FIG. 1, according to an embodiment of the present invention, an image display apparatus 100 can communicate with a broadcast station 210, a network server 220, or an external device 230.

The image display apparatus 100 can receive broadcast signals including image signals transmitted from the broadcast station 210. The image display apparatus 100 can process the broadcast signals including image, audio, or data signals such that those signals can be adapted to be outputted from the image display apparatus 100. The image display apparatus 100 can output image or audio based on the processed image signals.

On the other hand, the image display apparatus 100 can communicate with the network server 220. The network server 220 is a device transmitting/receiving the signals of the image display apparatus 100 through a certain network. For example, the network server 220 can be a cellular phone that can be connected with the image display apparatus 100 through a wired or wireless base station. Also, the network server 220 can be a device that provides contents to the image display apparatus 100 through internet network. Contents providers can provide contents to the image display apparatus 100 using a network server.

On the other hand, the image display apparatus 100 can communicate with the external device 230. The external device 230 is a device transmitting/receiving signals directly with the image display apparatus by wire or wirelessly. As an embodiment, the external device 230 includes not only media storage devices or play devices but also other electronic devices. That is, the external device 230 can be a camera, a Digital Versatile Disc (DVD) or a Blu-ray player, a Personal Computer (PC), a cellular phone, and an air conditioner.

The broadcast station 210, the network server 220, or the external device 230 can transmit to the image display apparatus 100 signals including image signals. The image display apparatus 100 can display images based on the image signals included in input signals. Also, signals transmitted from the external device 230 to the image display apparatus 100 can be transmitted to the broadcast station 210 or the network server 220. That is, the image display apparatus 100 can transmit and by itself play on the image display apparatus 100 contents included in the signals transmitted from the broadcast station 210, the network server 220, and the external device 230.

In addition, according to the present invention, application data related to an application executed in the image display apparatus 100 can be transmitted from the external device 230 to the image display apparatus 100 and the image display apparatus 100 can execute the application using the application data.

Figure 2:
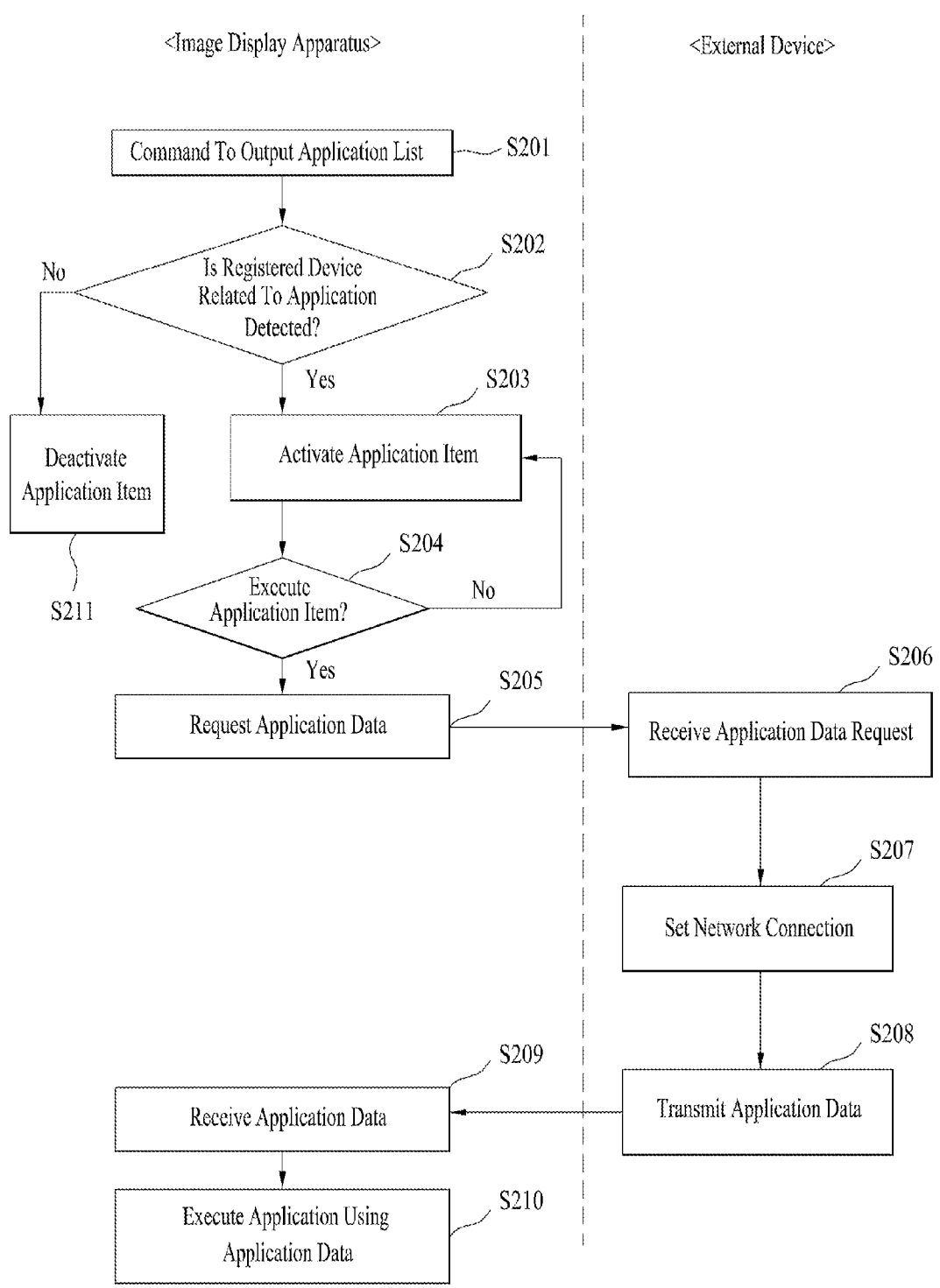
FIG. 2 shows a flowchart for receiving application data regarding an application from an image display apparatus and executing the application according to an embodiment of the present invention.

FIG. 2 is a flowchart illustrating the process of executing an application by receiving application data related to the application in an image display apparatus according to an embodiment of the present invention.

In FIG. 2, after the application data is requested by a device in the image display apparatus, the embodiment is illustrated by receiving the requested application data and executing the application.

Then, as the image display apparatus includes all the means that can display images, it can be a broadcast receiver, a PC, a mobile communications device, a camera, a DVD or a Blu-ray player.

As the device also includes all the means that can transmit application data while networked with the image display apparatus, it can be a broadcast receiver, a PC, a mobile communications device, a camera, a DVD or a Blu-ray player, an air conditioner, and an air purifier.

Referring to FIG. 2, the image display apparatus according to an embodiment of the present invention receives an application list command in the step of S201. Then, according to an embodiment, the application list can be a list of executing applications that are linked with external devices. In the drawing, although a list of the applications is shown as an embodiment, the present invention is not limited to only the list of the applications but can include simple description information of each application.

In the step of S202, the image display apparatus determines whether a device registered regarding application categories included in the application list is detected.

Then, the image display apparatus can prematurely store device information corresponding to the application in the storage unit, and after the device information corresponding to the application in the storage unit is analyzed, the image display apparatus detects a device using the analyzed device information.

Especially, the image display apparatus can detect devices that can connect networks by a wired communications method or a Local Area Network (LAN) method. For example, the image display apparatus 100 can connect networks with other devices based on communication standards such as Bluetooth, Radio Frequency Identification (RFID), Infrared Data Association (IrDA), and Digital Living Network Alliance (DLNA), and determines whether a device is detected within the LAN range.

Also, the image display apparatus, if the application selection signal is receive, detects a module required for executing the selected application and if the required module does not exist in the image display apparatus, the image display apparatus detects a device in which the required module exists.

The required module includes at least one of a Global Positioning System (GPS), location information module spotting the present location, camera module recording the images of a user and surroundings, a keyboard, a keypad, a mouse, and a user input interface receiving predetermined signals from the user.

Also, the image display apparatus displays a predetermined message if the device is not detected. That is, although a registered device exists, in the case that the registered device does not exist in a state in which the registered device cannot transmit/receive data with the present image display apparatus, a device connection request message can be displayed, and if a registered device does not exist, the device displays a device registration request message requesting that the device be registered in the image display apparatus.

In the step of S202, if a registered device related to an application is detected, in the step of S203, the image display apparatus activates an application item corresponding to the registered device in an application list so as to be selected, or displays to differentiate the registered device from other non-detected application categories.

Also, the image display apparatus can output on the display screen information about the detected device according to an embodiment.

For example, if a device 'Dv1' registered for an application 'App1' can connect networks or is already detected as connected in networks, an application 'App1' item can be activated or displayed to be differentiated from other categories, and according to an embodiment information about the device 'Dv1' can be displayed on the display screen.

With the result of the step of S202, if a registered device related to an application is not detected, the image display apparatus in the step of S211 deactivates an application item so as not to be selected, or displays to differentiate the application item related to the detected device.

In the step of S204, the image display apparatus determines whether an execution command related to the displayed application item to differentiate other non-detected device categories is received.

With the result of S204, if the application execution command related to the detected device application is received, the image display apparatus in the step of S205 requests application data to the detected device.

Then, according to an embodiment, the image display apparatus transmits a wired or wireless network connection request with the application data request to the detected device.

Next, in the step of S206, after the device receives the application data request, in the step of S207, the device sets wired or wireless network connection with the image display apparatus, and in the step of S208, the device transmits the application data requested from the image display apparatus to the image display apparatus.

Then, the image display apparatus can be connected by wired networks or by communications standards such as Bluetooth, RFID, IrDA, Ultra Wideband (UWB), ZigBee, and DLNA.

Based on necessity, the device can execute an application in order to generate application data. Then, functions other than the application data generation and transmission can be executed in a multi-task method.

In the step of S209, the image display apparatus receives application data from the device and in the step of S210 the image display apparatus executes the application using the received application data.

Then, the application data indicates information used for executing the application in the image display apparatus and includes other information related to the application execution.

For example, if the application executed in the image display apparatus is an application using GPS information, the application data received from the device can be GPS information.

Accordingly, an application 'App1' using GPS information is executed in the image display apparatus, the image display apparatus requests GPS information from the device that App1 uses, and after the device is connected by wired or wireless network, the GPS information can be transmitted to the image display apparatus. The image display apparatus executes App1 using the GPS information received from the device.

Also, according to an embodiment, the application data includes User Interface (UI) information related to the application executed in the device.

For example, the image display apparatus can request UI information related to an application 'App2' executed in the device, receives from the device and outputs UI information related to App2 on the display screen.

According to an embodiment, the application data can be information used for the application execution of diverse functions such as internet phone service, web album service, Social Networking Service (SNS), Location Base Service (LBS), map service, web search service, application search service, game service, calendar management service, and temperature or humidity information providing service, and information generated in the device and used for the application execution of the image display apparatus.

FIG. 3 is a drawing of an embodiment for storing device information corresponding to each application in an image display apparatus according to an embodiment of the present invention.

Referring to FIG. 3, the image display apparatus of the present invention can store device information 302, 303 corresponding to each application 301. Then, the device information can include a device identifier 302 and network information 303 of the device. The network information 303 of the device can include network address information used for requesting for application data to the device.

According to an embodiment, a plural number of the device can be set for an application corresponding to each device, and the device identifier and network information can be stored in the device.

For example, a device corresponding to an application 'App1' can be stored as 'Dv1' and 'Dv10', and in the case that the image display apparatus receives an execution command related to the application 'App1', after requesting application data related to 'Dv1' and 'Dv10', the application 'App1' is executed using the application data related to the received 'App1'.

Figure 4:
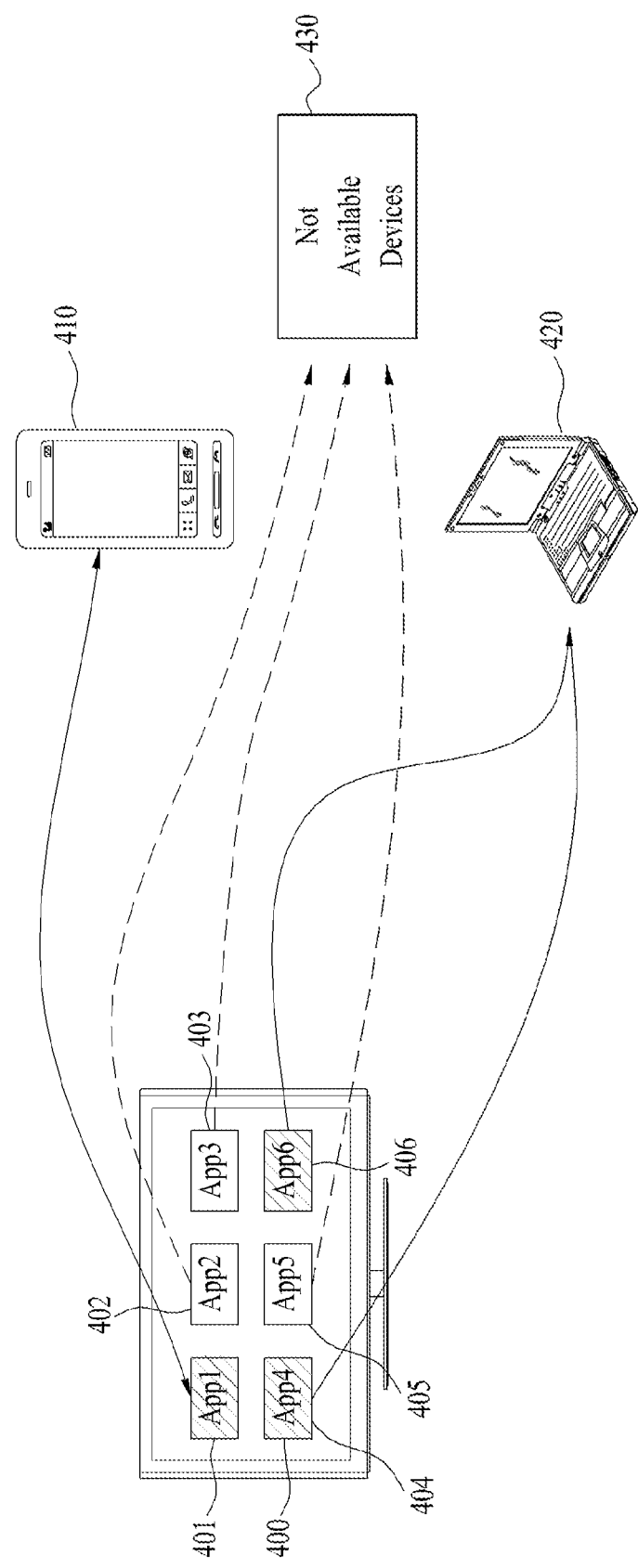
FIG. 4 shows a drawing of an application list displaying whether devices for each corresponding application provided by an image display apparatus are detected.

FIG. 4, according to the present invention, is a drawing of an embodiment displaying an application list displaying whether a device is detected for each application provided in the image display apparatus.

Referring to FIG. 4, the image display apparatus according to an embodiment of the present invention determines whether a device registered for application categories included in an application list 400 is detected.

Then, the image display apparatus, as mentioned, can prematurely store device information corresponding to an application in a storage unit, and after analyzing the device information corresponding to the application in the storage unit, the image display apparatus detects a device using the detected device information.

If a registered device related to the application is detected, the image display apparatus activates such that it can select the application item corresponding to the registered device in the application list, or display to differentiate other categories in which a registered device is not detected.

For example, if a registered device 410 related to 'App1' 401 included in the application list is detected within the wired or wireless network range, 'App1' item 401 is activated such that it can be selected or other categories 402, 403, 405 not detected within the wired or wireless network range are displayed such that they can be differentiated.

Also, as well, if a registered device related to 'App4' 404 and 'App6' 406 included in the application list is detected, the 'App4' item 404 and the 'App6' item 406 are activated such that they can be selected or the other application categories 402, 403, 405 where the device is not detected within the wired or wireless network range are displayed such that they can be differentiated.

In addition, according to an embodiment, the other application categories 402, 403, 405 where the registered device 430 within the wired or wireless network range is not detected are deactivated such that they cannot be selected or other application categories where a registered device is not detected are display such that they can be differentiated.

Figure 5:
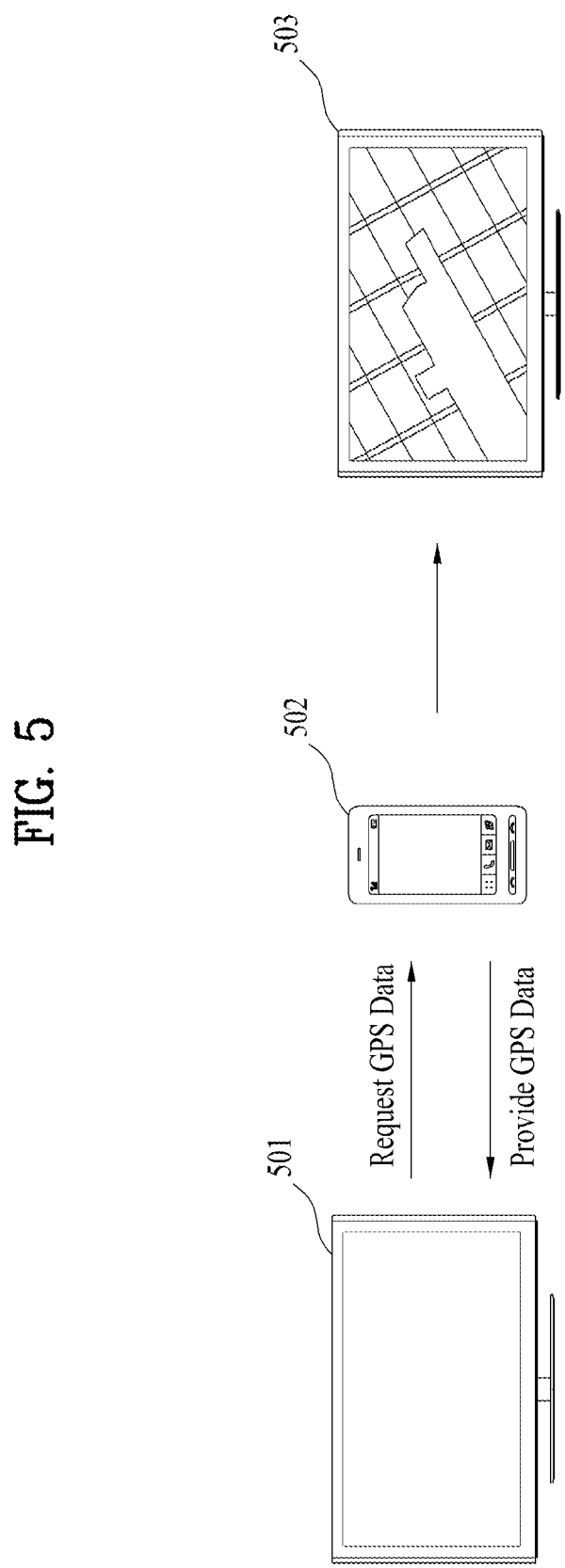
FIG. 5 shows a drawing of an embodiment of an image display apparatus of the present invention receiving application data from a device and executing an application.

FIG. 5 according to the present invention is a drawing of an embodiment for executing an application by receiving application data from a device in an image display apparatus.

Referring to FIG. 5, the image display apparatus 501 according to an embodiment of the present invention requests application data to a device 502, and can execute the application as if drawing arrows 503 are shown by receiving application data from the device 502.

If the device 502 receives an application data request, application data is generated and transmitted to the image display apparatus 501. Then, the device 502, according to an embodiment, can operate an additional application to generate application data.

For example, the image display apparatus 501 requests GPS data to the device 502, and executes the application using GPS data as if the drawing arrows 503 are shown by receiving GPS data from the device 502.

For example, the image display apparatus 501 can display location using the GPS data received from the device 502 in order to execute an application performing navigation.

If the device 502 receives the GPS data request from the image display apparatus 501, an application generating GPS data is executed and the generated GPS information can be transmitted to the image display apparatus 501.

Figure 6:
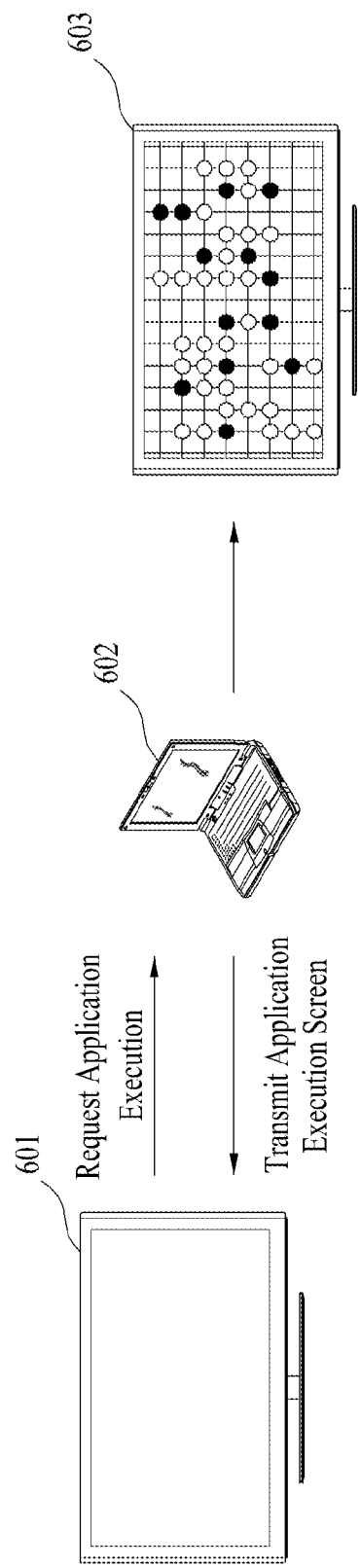
FIG. 6 shows a drawing of another embodiment in which an image display apparatus of the present invention receives application data from a device and executes an application.

FIG. 6 is a drawing of another embodiment for executing an application by receiving application data from a device in an image display apparatus according to the present invention.

Referring to FIG. 6, an image display apparatus 601 according to an embodiment of the present invention requests application data to a device 602, and executes an application as if drawing arrows 603 are shown by receiving the application data from the device 602.

For example, the image display apparatus 601 requests application execution data, and can display as if the drawing arrows 603 are shown by receiving the application execution data from the device 602.

If the device 602 receives the application execution data request from the image display apparatus 601, after executing the application generating the application execution data, the generated application execution data can be transmitted to the image display apparatus 601.

For example, in the case of applications requiring high-performance CPUs or a large memory space function, the image display apparatus 601 receives the execution screen (application execution data) of the application from the device 602, outputs it on the display screen, and executes the application by receiving the user input from the image display apparatus 601.

Then, the device 602 can be equipped with an additional application in order to transmit the execution screen of the application to the image display apparatus.

Figure 7:
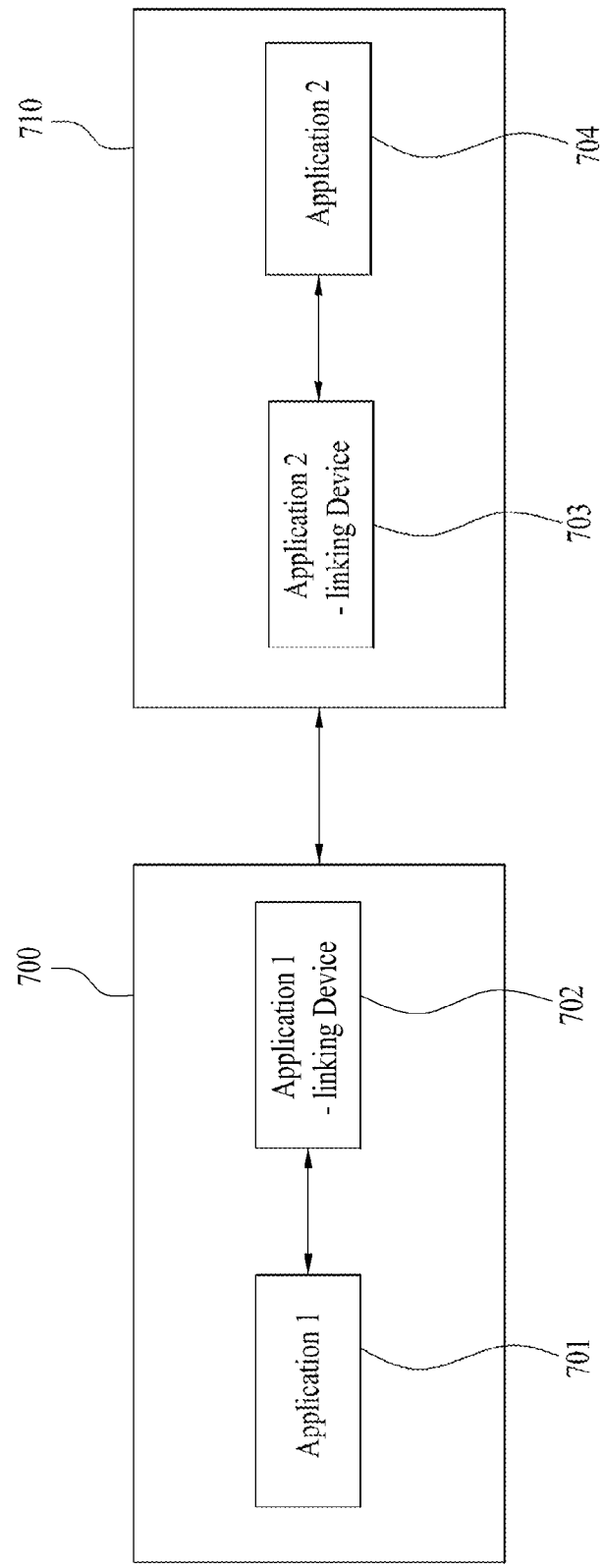
FIG. 7 shows a drawing of the configuration of an image display apparatus and devices according to an embodiment of the present invention.

FIG. 7 is a drawing of an image display apparatus and a configuration of the device according to an embodiment of the present invention.

Referring to FIG. 7, an image display apparatus 700 requests application data to a device and an application 1 701 operated by using application data received from the device and can be equipped with a device linked application 1 702 to receive application data.

Also, a device 710 receives an application data request from the image display apparatus 700 and can be equipped with an application 2 704 to generate application data and a device linked application 2 703 to transmit application data.

Also, according to an embodiment, each application can be equipped with the device-linked applications individually. For example, the application 1 701 comprises the device-linked application 1 702, and the application 2 704 can comprise the device-linked application 2 703.

Accordingly, although the present invention is not equipped with the application 2 704 in the image display apparatus 700, as application data related to the application 2 704 can be obtained in the image display apparatus 700 and operate the application 1 701, there is an effect such that high-spec application can be utilized without installing additional hardware in the image display apparatus 700.

That is, it is effective that the present invention only installs simple device-linked application in the image display apparatus such that high-spec and high-performance applications can be utilized in the image display apparatus without installing additional hardware and diverse applications can be utilized.

Figure 8:
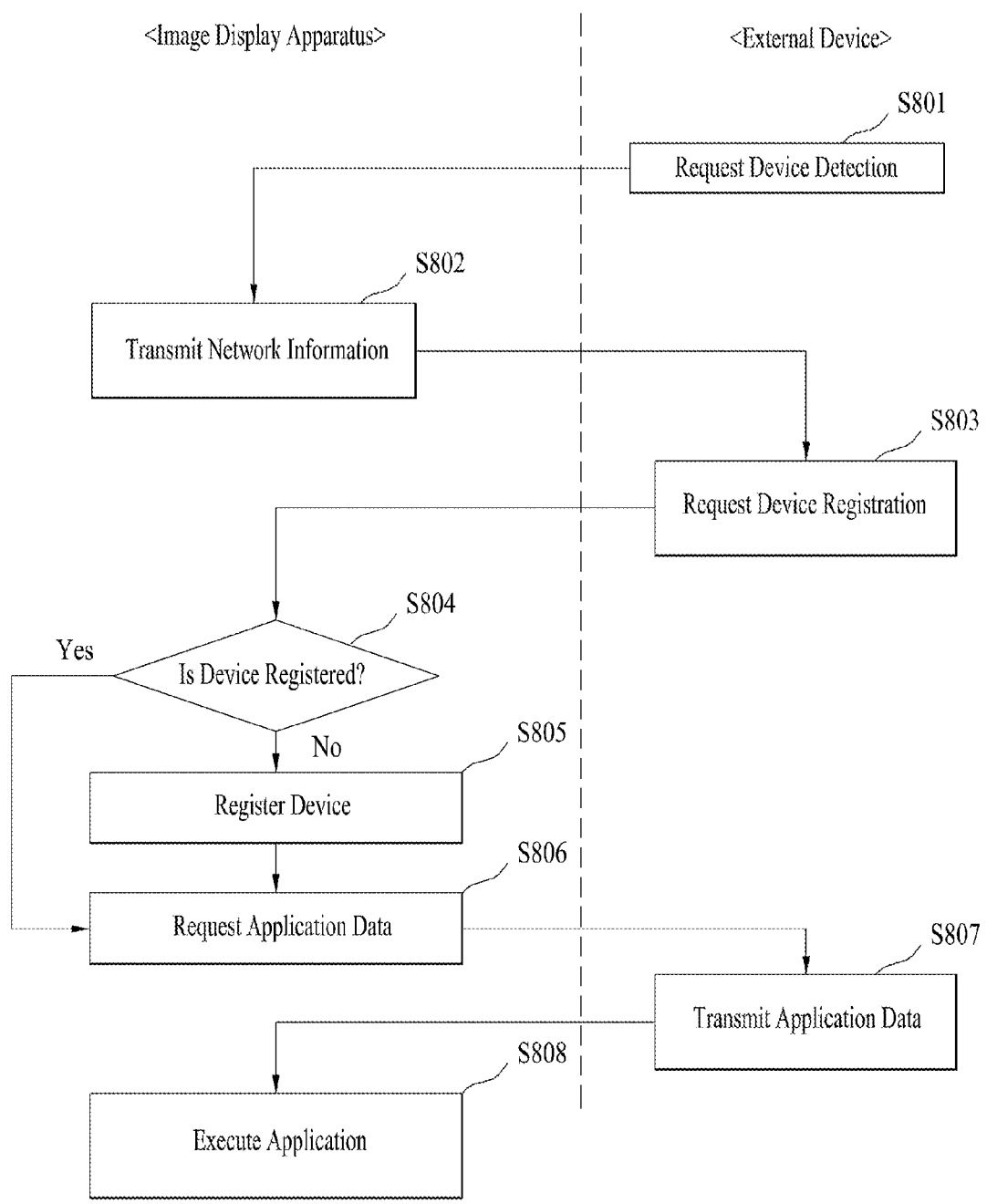
FIGS. 8 and 9 are a flowchart and a data structure for registering devices in correspondence with the applications based on a device-linking application according to an embodiment of the present invention.
Figure 9:
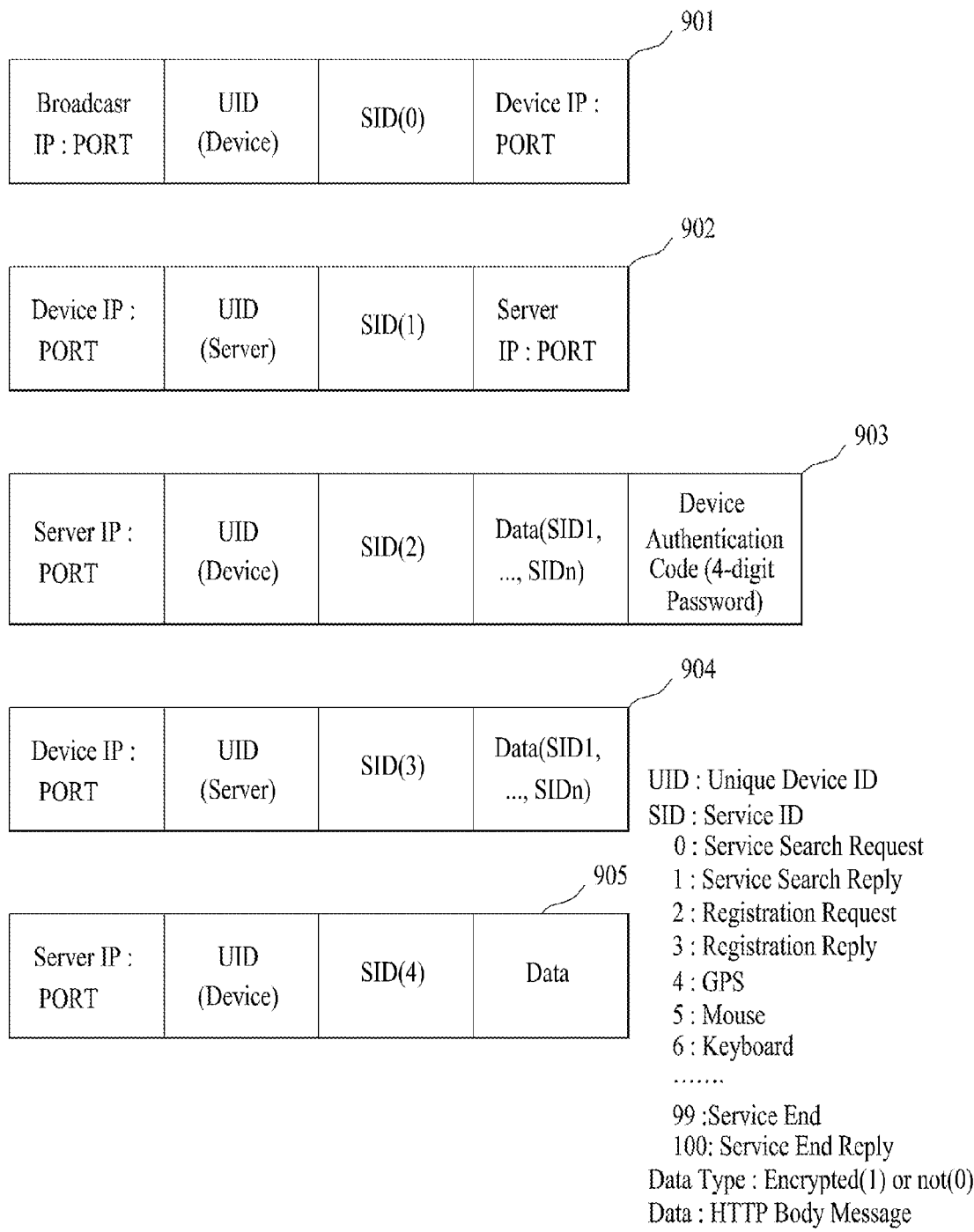

FIGS. 8 and 9 are drawings of a process in which according to an embodiment of the present invention based on the device-linking application, a device in correspondence with the application is registered.

Referring to FIG. 8, in the step of S801, the device transmits a device detection request to the image display apparatus. An embodiment of the device detection request can be as if a drawing diagram 901 is shown in FIG. 9. The device detection request can comprise a device identifier (UID), application detection request (SID0), and device IP port information.

In the step of S802, the image display apparatus responds to the device detection request and transmits network information. The response of the image display apparatus transmitting the network information can be as if drawing arrows 902 are shown in FIG. 9. The response of the image display apparatus transmitting the network information comprises server IP port information of the image display apparatus, device IP port information, image display apparatus identifier (UID), and application search response (SID(1)).

In the step of S803, after the image display apparatus receives the network information, a device registration request is transmitted to the image display apparatus. An embodiment of the device registration request can be as if drawing arrows 903 are shown in FIG. 9. The device registration request can comprise server IP port information of the image display apparatus, device identifier (UID), registration request information (SID(2)), application request information (SID1 . . . SIDN), device authentication information to authenticate the device.

If the device registration request is received, in the step of S804 the image display apparatus determines whether the device is a registered device or not. With the result of the determination in the step of S804, if the device is not a registered device, according to a device registration request in the step of S805, the device information of the device that corresponds to the application is stored.

Then, the image display apparatus outputs on the display screen whether the device is to be registered, temporarily registered, or not to be registered, and if a user selects to register or temporarily register, the device information can be stored in the application information corresponding to the device information. Also, according to an embodiment, only if the user correctly inputs the device authentication information by devices such as a remote control device, the device information corresponding to the application information can be set to be stored.

Especially, according to an embodiment, if the user selects to register, the device identifier (UID) and application request information (SID1 . . . SIDN) are registered such that the application data can be continuously transmitted without the registered device identifier and the application request information although the network information of the device (e.g., IP address) is changed.

In the step of S805, if the device registration is completed, the image display apparatus in the step of S806 transmits a response of the registration completion to the device and requests application data. Registration completion response can be as if drawing arrows 904 are shown in FIG. 9. The registration completion response can comprise device IP port information, image display apparatus identifier (UID), registration response information (SID(3)), and application request information (SID1 . . . SIDN).

In the step of S807, the device transmits application data, and in the step of S808, the image display apparatus executes the application using the application data, as illustrated. An application transmission format comprises image display apparatus IP port information, device identifier (UID), and application data (SID(4)).

Although FIGS. 8 and 9 illustrated a case in which the image display apparatus operates as a server, the device can be obviously adopted to a case in which the device operates as a server.

Figure 10:
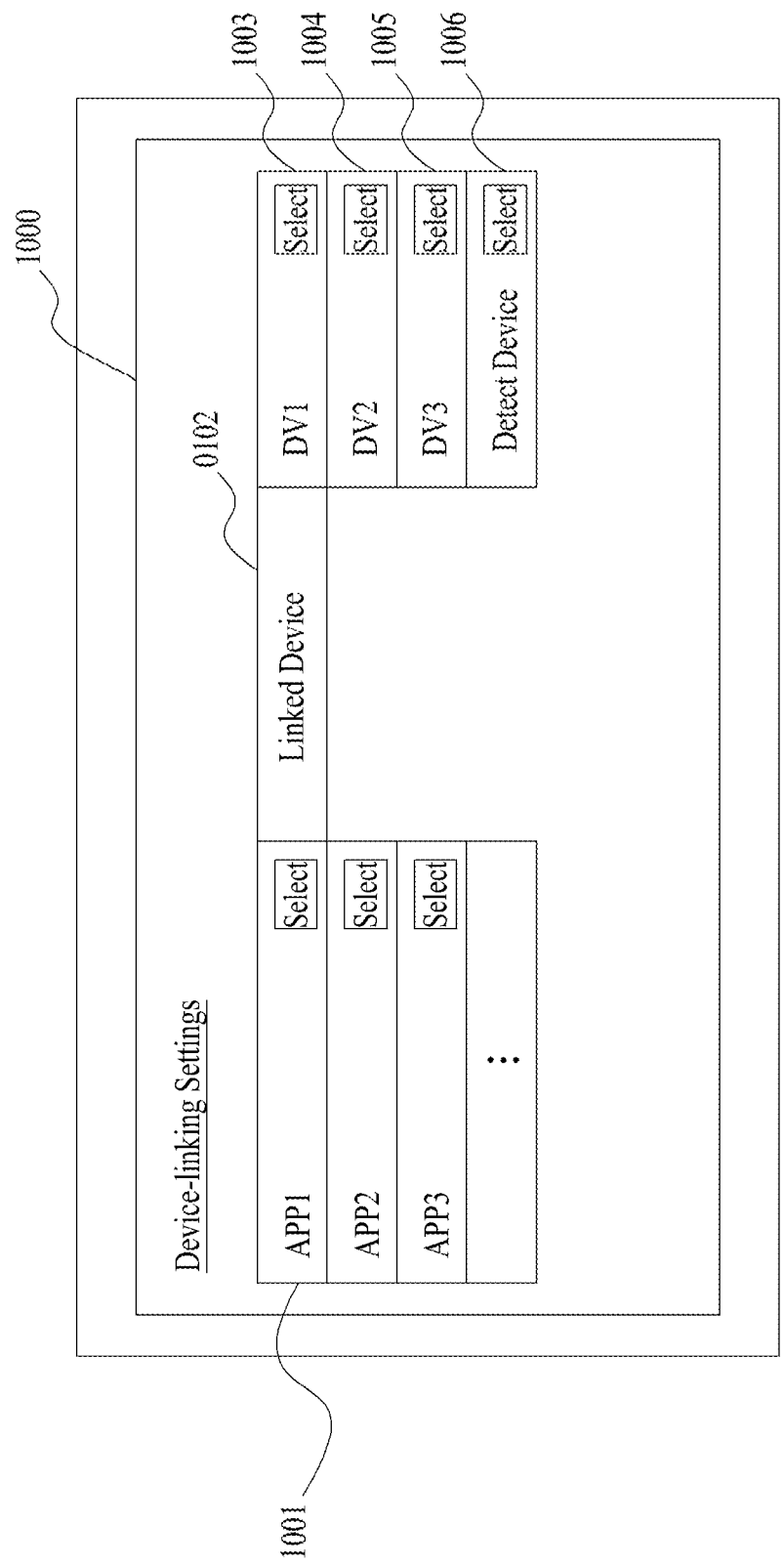
FIG. 10 shows a drawing of a user interface setting linked devices for each device-linking application according to an embodiment of the present invention.

FIG. 10 is a drawing of a user interface setting a device to link an application in an image display apparatus according to an embodiment of the present invention.

Referring to FIG. 10, the image display apparatus can let the user select a device that links an application. For example, 'APP1' 1001 is selected, it can be displayed to a linking device 1002 that devices 1003, 1004, 1005 detected by wired or wireless network can be selected. If one or more of the devices 1003, 1004, 1005 are selected, the device or devices can be registered in correspondence with the applications through the FIG. 8 process.

Then, the device-linking application 1 to be installed in the image display apparatus and the device-linking application 2 to be installed in the device can be installed by a network received from an external server and the device-linking application 1 can be prematurely installed in the image display apparatus and the device-linking application 2 to be installed in the device can be transmitted from the image display apparatus to the device.

Also, according to an embodiment, in the case that the device detection 1006 is selected, device information corresponding to the application can be stored by additional detection.

Figure 11:
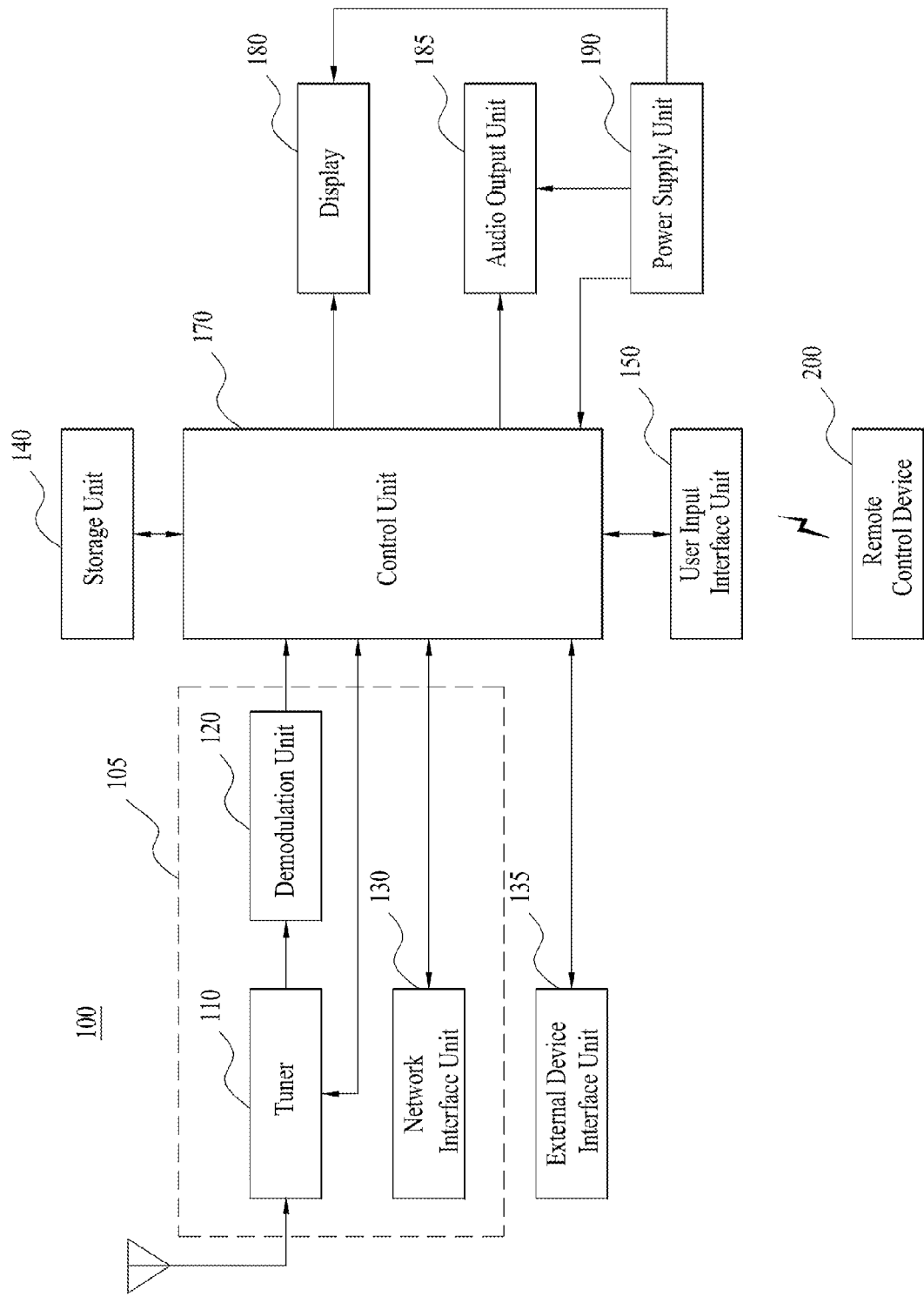
FIG. 11 shows an internal block diagram of an image display apparatus according to an embodiment of the present invention.

FIG. 11 is an internal block diagram of an image display apparatus according to an embodiment of the present invention.

Referring to FIG. 11, the image display apparatus 100 according to an embodiment of the present invention comprises a broadcast receiving unit 105, an external device interface unit 135, a storage unit 140, a user input interface unit 150, a control unit 170, a display unit 180, an audio output unit 185 and a power supply unit 190. The broadcast receiving unit 105 can comprise a tuner 110, a demodulating unit 120 and a network interface unit 130. Amongst them, the broadcast receiving unit 105 can selectively comprise the tuner 110 and the demodulating unit or the network interface unit 130.

The tuner 110 selects a channel chosen by the user among RF (Radio Frequency) broadcast signals received via antenna or an RF broadcast signal included in all predetermined channels. Also, the selected RF broadcast signal is converted to a middle frequency signal, base band image or audio signal.

For example, the selected RF broadcast signal, if it is a digital broadcast signal, is converted to digital IF signal (DIF), and if it is an analog broadcast signal, the selected RF broadcast signal is converted to an analog base band video or audio signal (CVBS/SIF). That is, the tuner 110 can process digital broadcast or analog broadcast signals. The analog based band video or audio signal (CVBS/SIF) outputted from the tuner 110 can be directly inputted from the control unit 170.

Also, the tuner 110 can receive RF broadcast signals of a singular carrier based on ATSC (Advanced Television System Committee) and RF broadcast signals of a plural carrier based on DVB (digital Video Broadcasting).

On the other hand, the tuner 110 selects in sequence RF broadcast signals of all broadcast channels stored by channel memory function among RF broadcast signals received through antenna and converts the signals to middle frequency signals or base band video or audio signals.

The demodulation unit 120 receives and demodulates digital IF signals (DIF) converted in the tuner 110.

For example, in the case that the digital IF signal outputted from the tuner 110 is the ATSC type, the demodulating unit 120 performs 8-VSB (8-Vestigal Side Band). Also, the demodulating unit 120 can perform channel decoding. For that, the demodulation unit 120 is equipped with a Trellis Decoder, De-interleaver, and Reed Solomon Decoder, and can perform Trellis decoding, deinterleaving, and Reed-solomon decoding.

For example, in the case that the digital IF signal outputted from the tuner 110 is the DVB type, the demodulating unit 120 demodulates COFDMA (Coded Orthogonal Frequency Division Modulation). Also, the demodulating unit 120 can perform channel decoding. For that, the demodulating unit 120 is equipped with a convolution decoder, deinterleaver, and reed-solomon decoder, and can perform convolution decoding, deinterleaving, and reed-solomon decoding.

The demodulating unit 120 can output stream signals (TS) after demodulating and channel decoding. Then, the stream signal can be a video signal, audio signal or multiplexed data signal. As an embodiment, the stream signal can be a Moving Picture Experts Group (MPEG)-2 TS (Transport Stream) multiplexed with MPEG-2 standard video signals and Dolby AC-3 standard audio signals. In more details, the MPEG-2 TS can include a 4-byte header and 184-byte payload.

On the other hand, the aforementioned demodulating unit 120 can be equipped with the ATSC method and DVB method individually. That is, the ATSC demodulation unit and DVB demodulation unit can be equipped.

The stream signal outputted from the demodulating unit 120 can be controlled by the control unit 170. After de-multiplexing and processing audio and video signals, the control unit 170 outputs video on the display unit 180 and outputs audio in the audio output unit 185.

The external device interface unit 135 can connect an external device and the image display apparatus 100. For that, the external device interface unit 135 can include an A/V input/output unit (not shown) or wireless communications unit (not shown).

The external device interface unit 135 connect external devices such as DVD (Digital Versatile Disk), Blu ray, game console, camera, camcorder, computer(laptop) by wired or wirelessly. The external device interface 135 transmits video, audio or data signals inputted by the connected external device to the control unit 170 of the image display apparatus 100. Also, video, audio or data signals processed from the control unit 170 can be outputted to the connected external device. For that, the external device interface unit 135 can include an A/V input/output unit (not shown) or wireless communications unit (not shown).

The A/V input/output unit comprises a USB port, a CVBS (Composite Video Banking Sync) port, a component port, an S-video port (analog), a DVI (Digital Visual Interface) port, a HDMI (High Definition Multimedia Interface) port, an RGB port, and a D-SUB port such that video and audio signals of the external device can be inputted to the image display apparatus 100.

The wireless communications unit can perform LAN with other external devices. The image display apparatus 100 can network with other devices based on communications standards such as Bluetooth, RFID (Radio Frequency Identification), IrDA (Infrared Data Association), UWB (Ultra Wideband), Zigbee, and DLNA (Digital Living Network Alliance).

Also, the external device interface unit 135 can be connected with diverse set-top boxes and at least one of the aforementioned ports and perform inputting and outputting with a set-top box.

On the other hand, the external device interface unit 135 can receive application data in the nearby external device and transmit it to the control unit 170 or the storage unit 140.

Also, the external device interface unit 135 determines whether a device registered in an application is detected, and if the device is detected, the detected device requests application data and receives the application data.

Then, the control unit 170 executes the application using the received application data. As mentioned, the application data can include execution information of the application or user interface information about the execution of the application.

Also, the external device interface unit 135, if an application selection signal is received through the user input interface unit 150, detects a module required for executing the selected application, and if the required module does not exist in the image display apparatus, it detects a registered device in which the required module exists.

As mentioned in FIG. 2, the required module includes at least one of a location information module, camera module, or user interface module.

Also, the external device interface unit 135, if the device is detected, requests application data to the detected device and receives the application data if the device is detected and only in the case that a confirmation signal about whether the detected device is to be connected is received through the user input interface unit 150.

Then, the control unit 170, if the device is not detected by the external device interface unit 135, can control such that at least one of a device connection request message or device registration request message can be displayed.

The display unit 180 can output information about the detected device.

Also, the storage unit 140 registers and stores device information in correspondence with the application.

Then, the control unit 170 outputs an application list including the application items on a display screen, and if a device registered in the application is detected, displays the application item such that the application item in which the device registered in the application is detected can be differentiated or activated to be selected.

Also, the control unit 170 outputs the application list including the application items on the display screen, and, if a device registered in the application is detected, displays the application item such that the application item in which the device registered in the application list is detected can be differentiated or activated to be selected.

Then, the external device interface unit 135 requests the application data to a device registered in the application selected in the application item and receives the application data.

Also, the external device interface unit 135, if an execution command about the application is selected, determines whether a device registered in the application is detected.

Also, the external device interface unit 135, if the device is detected, sets the detected device with wired or wireless network and can receive the application data through the pre-set network. For this, the network can include LAN.

The network interface unit 130 provides an interface to connect wired/wireless network including internet network. The network interface unit 130 can be equipped with an Ethernet port for the wired network connection and with an WLAN (Wireless LAN) (Wi-Fi), Wibro (Wiress broadband), Wimax (World Interoperability for Microwave Access), and HSDPA (High Speed Downlink Packet Access) for the wireless network connection.

The network interface 130 can connect a webpage through network. That is, by connecting the webpage through network, data can be transmitted or received with the corresponding server. Besides that, data or contents provided by a contents provider or network manager can be received. That is, through network, movies, commercials, games, VODs, broadcast signals and information about those contents provided by the contents provider or the network provider can be received. Also, update information about firm ware provided by the network manager and update files can be received. Also, data can be transmitted to the internet or contents providers or network managers.

Also, the network interface unit 130 selects and receives an application among applications open in public through network.

The storage unit 140 stores a program for controlling and processing one or more signals in the control unit 170.

Also, the storage unit 140 can perform a temporary storage function for video, audio or data signals inputted from the network interface unit 130.

Also, the storage unit 140 can store an application inputted from the external device interface unit 135 or network interface unit 130.

The storage unit 140 can comprise at least one of storing devices such as a flash memory type, hard disk type, multimedia card micro type, memory of card types (for example, SD or XD memory), Random Access Memory (RAM), and Read Only Memory (ROM) (EEPROM). The image display apparatus 100 plays contents files stored in the storage unit 140 (video files, snapshots files, music files, documents files and application files) and provide users with them.

FIG. 11 shows an embodiment in which the storage unit 140 and the control unit 170 are separately equipped but the scope of the present invention is not limited to such scope. The storage unit 140 may be included in the control unit 170.

The user input interface unit 150 transmits a signal inputted by the user to the control unit 170 or transmits a signal from the control unit 170 to the user.

For example, the user input interface unit 150 receives and processes user input signals or control signals of Power On/Off, channel selection, screen setting, etc. from the remote control device 200 based on diverse communications methods such as RF (Radio Frequency) communications and IR communications methods, or processes such that control signals from the control unit 170 is transmitted to the remote control device 200.

Also, for example, the user input interface unit 150 can transmit user input signals or control signals inputted in local keys (not shown) such as the power key, channel key, volume key, and settings key to the control unit 170.

Also, for example, the user input interface unit 150 transmits user input signals or control signals inputted from a sensing unit (not shown) sensing gestures of a user to the control unit 170 or transmits signals from the control unit 170 to the sensing unit (not shown). Here, the sensing unit (not shown) can comprise a touch sensor, audio sensor, location sensor, and movement sensor.

The control unit 170 de-multiplexes streams inputted through the tuner 110, the demodulating unit 120, or the external device interface 135, processes the de-multiplexed signals, and generates and outputs signals for video and audio outputs.

Video signals image-processed in the control unit 170 are inputted to the display unit 180 and may be displayed in video in correspondence with the video signals. Also, the video signals image-processed in the control unit 170 may be inputted to an external input device through the external device interface unit 135.

Audio signals processed in the control unit 170 may be outputted in audio to the audio output unit 185. Also, the audio signals processed in the control unit 170 are inputted to an external device through the external device interface unit 135.

Although not shown in FIG. 11, the control unit 170 can comprise a de-multiplexer unit and image processing unit. With regard to that, it will be illustrated below in reference with FIG. 12.

Besides that, the control unit 170 can control regular operations in the image display apparatus 100. For example, the control unit 170 controls the tuner 110 and controls such that channels selected by the user or RF broadcast corresponding to predetermined channels can be selected for tuning.

Also, the control unit 170 can control user commands inputted through the user input interface unit 150 or the image display apparatus by an external program. Especially, by connecting network, an application that the user desires or an application category can be downloaded in the image display apparatus 100.

For example, the control unit 170 controls the tuner 110 such that signals of the selected channel can be inputted through the user input interface unit 150 based on a received channel selection command. And, video, audio, or data signals of the selected channel are processed. The control unit 170 can output channel information selected by the user with the processed audio or video signals to the display unit 180 or the audio output unit 185.

As another embodiment, the control unit 170, based on external device image play commands, outputs video or audio signals, inputted from through the external device interface unit 135, of external devices such as a camera and camcorder to the display unit 180 or the audio output unit 185.

On the other hand, the control unit 170 can control the display unit 180 such that images are displayed. For example, it controls such that broadcast images inputted through the tuner 110, external input video inputted through the external device interface unit 135, video inputted through the network interface unit, or video stored in the storage unit 140 are displayed on the display unit 180. Then, video displayed on the display unit 180 can be snapshot images, motion pictures, 2-Dimensional (2D) images or 3-Dimensional (3D) images.

On the other hand, the control unit 170 can control such that downloadable applications from network inside or outside the image display apparatus 100 or application items are displayed.

The control unit 170, along with diverse user interfaces, can control such that downloadable applications from external network can be installed and operated. Also, by the user's selection, images related to the executed application can be controlled to be displayed in the display unit 180.

On the other hand, although not shown in the drawing, a channel browsing processor unit generating thumbnail images corresponding to channel signals or external input signals can be further equipped. The channel browsing processor unit receives stream signals outputted from the demodulation unit 120 or the external interface unit 135, and can generate the thumbnail images extracted from the inputted stream signals. The generated thumbnail images can be inputted directly or encoded to the control unit 170. Also, the generated thumbnail images can be inputted encoded as a stream type to the control unit 170. The control unit 170 can display a thumbnail list with which a plurality of thumbnail images is equipped. On the other hand, thumbnail images in such thumbnail list can be simultaneously or in order. Accordingly, the user can easily find out the contents of a plurality of broadcast channels.

The display unit 180 converts video signals, data signals, On Screen Display (OSD) signals processed in the control unit 170 or video signals, data signals received in the external device interface unit 135 into R, G, B signals and generates driving signals.

The display unit 180 can be Plasma Display Panel (PDP), Liquid Crystal Display (LCD), Organic Light Emitting Diode (OLED), Flexible Display, and 3D display.

On the other hand, the display unit 180 can comprise a touch screen and be utilized as an input device in addition to an output device.

The audio output unit 185 receives speech processed signals such as stereo signals, 3.1 channel signals, or 5.1 channel signals from the control unit 170 and outputs them in audio. The audio output unit 185 can be realized as diverse types of speakers.

On the other hand, a camera unit (not shown) that records the user can be additionally equipped. Although the camera unit (not shown) can be realized with one camera, it is not limited to that and a plurality of cameras can be realized. Recorded images information in the camera unit is to be inputted in the control unit 170.

On the other hand, in order to sense a user's gestures, as mentioned, a sensing unit (not shown) having at least one of a touch sensor, audio sensor, location sensor, and movement sensor can be additionally equipped with the image display apparatus. The sensed signals in the sensing unit can be transmitted to the control unit 170 through the user input interface unit 150.

The control unit 170 can sense the user's gestures with the recorded images from the camera unit (not shown) or sensed signals in the sensing unit or both combined.

The power supply unit 190 supplies power corresponding to all parts of the image display apparatus 100. Especially, power can be supplied to the control unit 170 which can be realized as System on Chip (SOC), the display unit 180 for the image display, and the audio output unit 185 for the audio output.

For that, the power supply unit 190 can be equipped with a converter (not shown) converting alternative power to direct power. On the other hand, for example, if the display unit 180 is realized as a Liquid Crystal Panel having a plurality of backlight lamps, for driving luminescent variables or dimming, an inverter (not shown) that can perform the PWM operation can be additionally equipped.

The remote control device 200 transmits user inputs to the user input interface unit 150. For that, the remote control device 200 can use Bluetooth, RF (Radio Frequency) communications, IR communications, UWB (Ultra Wideband), and ZigBee method.

Also, the remote control device 200 receives video, audio, or data signals outputted in the user input interface unit 150 and displays in the remote control device 200 or outputs in audio or vibration.

The aforementioned image display apparatus 100 may be a digital broadcast receiver receiving at least one of digital broadcasts of ATSC type (8-VSB type), DVB-T type (COFDM type), and ISDB-T type (BST-OFDM type).

On the other hand, the image display apparatus illustrated in the specification is an image display apparatus without the display unit 180 and audio output unit 185 illustrated in FIG. 11 and can be a wireless type transmitting/receiving data with the display unit 180 and audio output unit 185 through wireless communications.

On the other hand, the block diagram of the image display apparatus 100 illustrated in FIG. 11 is a block diagram for an embodiment of the present invention. Based on the specifications of the image display apparatus 100 that is actually realized, each component of the block diagram may be combined, added, or deleted. That is, based on the necessity, more than two components can be combined as one element, or one component can be split into more than two components. Also, functions for each block are to explain the embodiment of the present invention and each specific operation or device do not limit the authority of the present invention.

On the other hand, the image display apparatus 100, unlike how it is illustrated in FIG. 11, does not have the tuner 110 and the demodulation unit 120, but receives video contents through the network interface unit 130 or external device interface unit 135, and play them.

Figure 12:
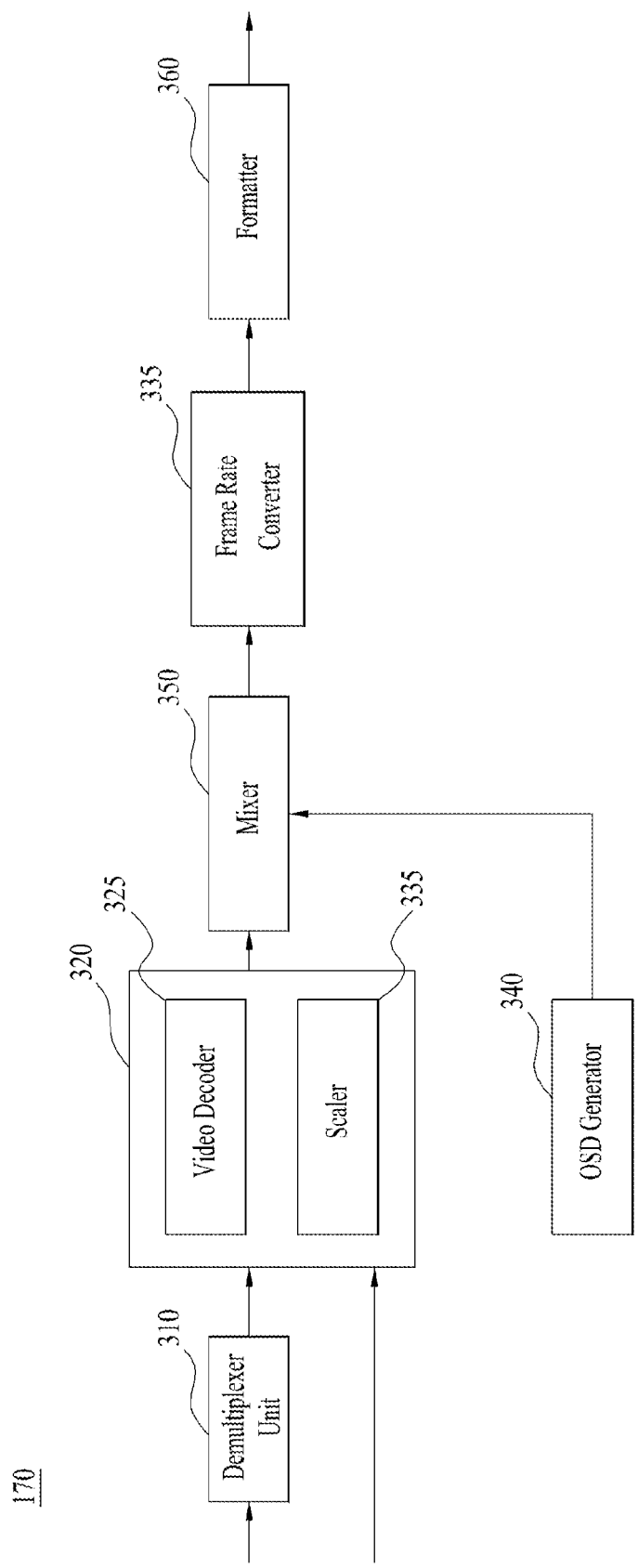
FIG. 12 shows an internal block diagram of a control unit shown in FIG. 11.

FIG. 12 is an internal block diagram of the control unit of FIG. 11.

Referring to the drawing, according to an embodiment of the present invention, the control unit 170 may comprise a demultiplexer unit 310, image processor unit 320, OSD generator unit 340, mixer 350, frame rate converter 355, and formatter 360. Besides these, a speech processor (not shown) and data processor (not shown) may be further comprised.

The demultiplexer unit 310 demutiplexes inputted streams. For example, in the case of MPEG-2 TS being inputted, it is demultiplexed and split in video, audio, data signals. Here, the stream signals inputted in the demultiplexer 310 can be stream signals outputted in the tuner 110, demodulation unit 120, or external device interface unit 135.

The image processor 320 can image-process the demultiplexed video signals. For that, the image processor 320 can be equipped with an image decoder 325 and scaler 335.

The image decoder 325 decodes the demultiplexed video signals and the scaler 335 performs scaling such that the resolution of the decoded video signals can be outputted in the display unit 180.

The image decoder 325 can be equipped with diverse standards of decoder.

For example, if the demultiplexed video signals are the encoded video signals of the MPEG-2 standard, they can be decoded by the MPEG-2 decoder.

Also, for example, if the demultiplexed video signals are the encoded video signals of the DMB (Digital Multimedia Broadcasting) method or H.264 standards based on DVB-H, they can be encoded by the H.264 decoder.

On the other hand, video signals decoded in the image processor 320 are inputted in the mixer 350.

The OSD generator unit 340 generates OSD signals by itself or based on user's inputs. For example, based on the user input signals or control signals, signals for displaying many pieces of information in graphics or texts on a display unit 180 screen can be generated. The generated OSD signals can comprise diverse data such as a user interface screen of the image display apparatus 100, diverse menu screens, widgets, and icons.

For example, the OSD generator unit 340 can generate signals for displaying subtitles of broadcast video or broadcast information based on EPG.

The mixer 350 can mix the OSD signals generated in the OSD generator unit 340 and the decoded video signals that are image-processed in the image processor unit 220. The mixed signals are provided to a formatter 350. As the decoded broadcast video signals or external input signals and OSD signals are mixed, the OSD in the broadcast video or external input video is overlaid and can be displayed.

The frame rate converter (FRC) 355 can convert the frame rate of the input video. For example, the frame rate of 60 Hz is converted to 120 Hz or 240 Hz. If the frame rate of 60 Hz is converted to 120 Hz, a same first frame can be inserted between the first and a second frames, or a third frame predicted from the first and second frames can be inserted. If the frame rate of 60 Hz is converted to 240 Hz, three of the same frame can be inserted or three of the predicted frame can be inserted. On the other hand, a frame rate with no additional converted input can be maintained.

The formatter 360 receives output signals of the frame rate converter unit 355, changes and outputs the format of the signals such that the signals can be adoptive to the display unit 180. For example, R, G, B data signals can be outputted and such R, G, B data signals can be outputted as Low Voltage Differential Signaling (LVDS) or mini-LVDS.

On the other hand, the speech processor unit (not shown) in the control unit 170 can perform speech processing for the demultiplexed audio signals. For that, the speech processor unit (not shown) can be equipped with diverse decoders.

The speech processor unit (not shown) inside of the control unit 170 can decode the signals if the demultiplexed audio signals are encoded audio signals. For example, the demultiplexed audio signals can be decoded by an MPEG-2 decoder, an MPEG 4 decoder, an AAC decoder, or an AC-3 decoder.

Also, the speech processor unit (not shown) inside of the control unit 170 can perform base, treble, and volume adjusting.

The data processor unit (not shown) inside of the control unit 170 can perform data processing for the demultiplexed data signals. For example, in the case that the demultiplexed data signals are encoded signals, they can be decoded. The encoded data signals can be EPG (Electronic Program Guide) information including the starting and ending times of broadcast programs aired on each channel. For example, the EPG information, in the case that it is the ATSC type, can be ATSC-PSIP (ATSC-Program and System Information Protocol) information and in the case that it is the DVB type, it can include DVB-SI (DVB-Service Information) information. The ATSC-PSIP information or DVB-SI information can be information included in the aforementioned stream, that is, MPEG-2 TS header (4 byte).

On the other hand, the block diagram of the control unit 170 shown in FIG. 12 is a block diagram for an embodiment of the present invention. Each component of the block diagram can be combined, added, or deleted depending on the specs of the control unit to be actually realized.

Figure 13:
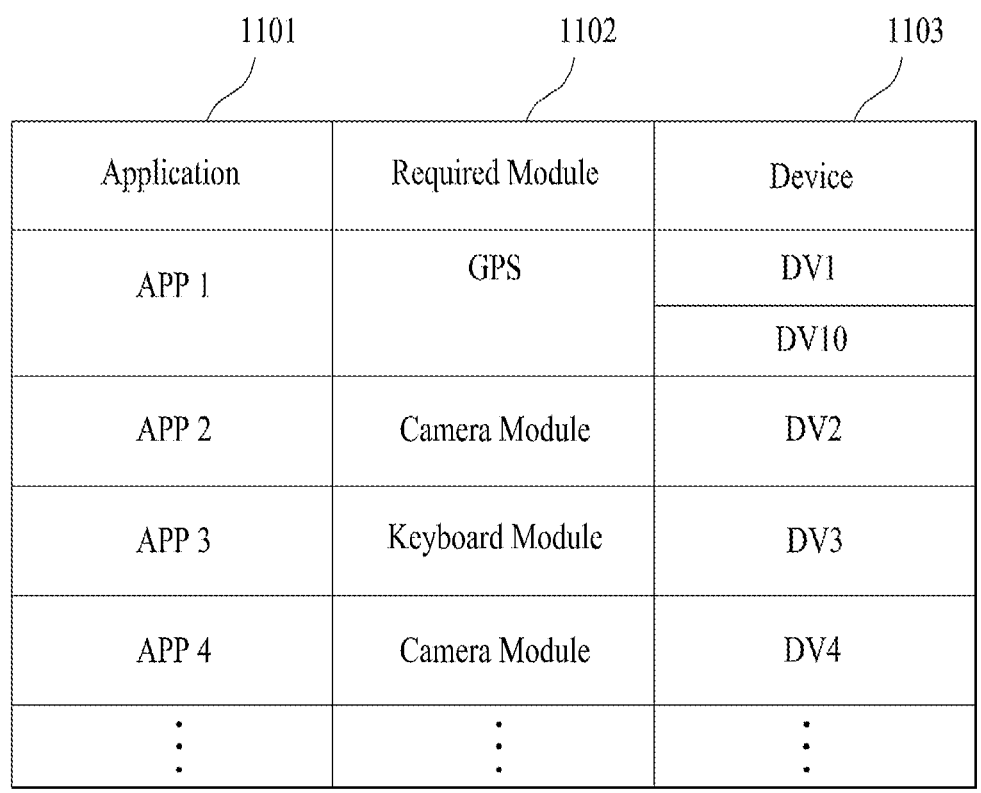
FIG. 13 shows a flowchart displaying an application execution process including an additional step of whether an external device in the flowchart of FIG. 2.

FIG. 13 is a flowchart of an application execution process including a step of selecting an option of whether an external device is to be used in the flowchart of FIG. 2.

According to an embodiment, the image display apparatus, if the application item output command (S201) is received, can receive a selection signal about whether an external device is to be used to execute the application. (S2021).

That is, according to the present invention, to execute an application using a specific module not equipped in the image display apparatus, the image display apparatus can transmit/receive data to execute the application with one or more devices but the user may not want to transmit/receive the data for the purposes of network connection charge, security data leakage, or device battery dissipation.

Accordingly, the image display apparatus displays a menu before detecting a device required for the application execution, and receives from the user a selection signal about whether an external device is to be used to execute the application in the image display apparatus. The menu will be further illustrated in FIG. 16 in the following.

Accordingly, in the case that a selection signal for using the device is inputted from the user, the image display apparatus can detect a device. S202. Meanwhile, in the case that a selection signal for not using the device is inputted from the user, the image display apparatus can deactivate application items required for connecting external devices. S2022.

That is, through the aforementioned step, the user can prevent data transmission/reception for detecting external devices in the image display apparatus if not desired.

Figure 14:
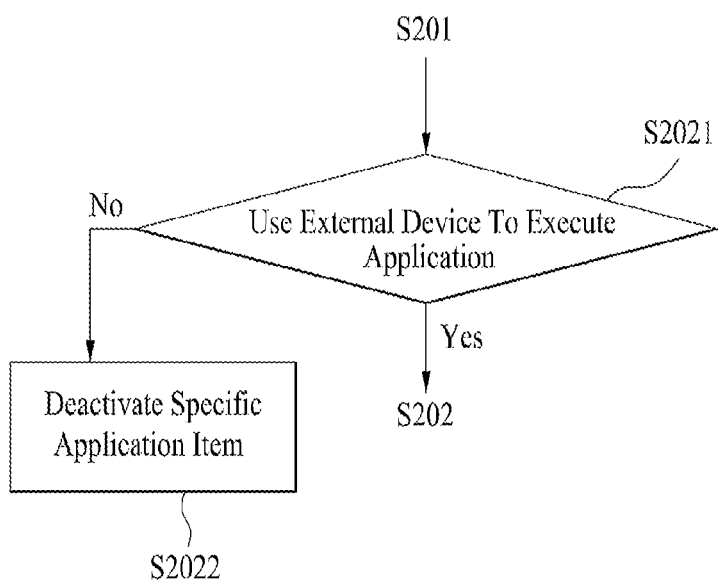
FIG. 14 shows a drawing of an embodiment of an image display apparatus storing modules required for each application and corresponding device information.

FIG. 14 is a drawing of an embodiment for storing required modules and corresponding device information for each application in the image display apparatus according to an embodiment of the present invention.

Referring to FIG. 14, the image display apparatus can store information 1102 of a device equipped with the required module and information 1102 about the required module corresponding to each application 1101 in the image display apparatus according to an embodiment of the present invention. Then, the required module information 1102 as information about the demanded module to execute the application may include a location information module, camera module, and keyboard module including GPS (Global Positioning System). Also, the device information 1103 may include device names for each required module. Also, with the device names, the image display apparatus can include network address information that can be used for requesting application data to the device from the image display apparatus.

According to an embodiment, a number of required modules and devices corresponding to one application can be set plural and store device identifiers for each and network information.

For example, a required module corresponding to the application 'App 1' is a GPS module, a device equipped with the GPS module is 'Dv1' and 'Dv10', and in the case that an execution command about the application 'App1' is received, the image display apparatus can execute the application 'App1' using application data about the received 'App1' after requesting application data about 'Dv1' and 'Dv10'.

Figure 15:
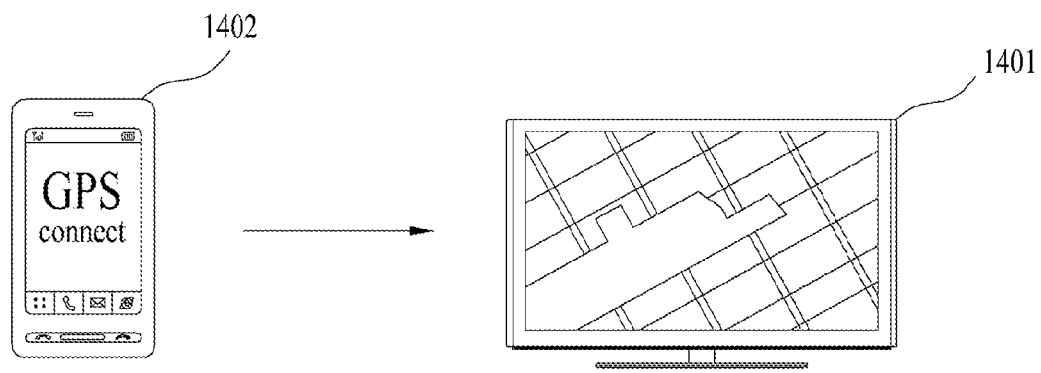
FIG. 15 shows an embodiment of a process of data transmission/reception between an image display apparatus and a device according to the present invention.

FIG. 15 is a drawing of an embodiment in which data transmission/reception is processed between the image display apparatus and device according to the present invention.

Referring to FIG. 15, as illustrated in FIG. 5, the image display apparatus according to an embodiment of the present invention requests application data to a device 1402 and executes the application from the device 1402 by receiving the application data.

That is, as shown in FIG. 15, the image display apparatus 1401 can display the location by using the received GPS data from the device 1402 in order to execute an application that performs navigation.

In that case, the image display apparatus 1401 displays executing screen of the application on the display screen and the device 1402 can display a message that the current GPS module is being used to execute the application of the image display apparatus.

Accordingly, in the case that a specific module of the device is being used by executing an application in the image display apparatus, the user can sense that the specific module is being used and prevent actions that can affect the application execution such as turning of the device 1402 for not sensing the actions.

Figure 16:
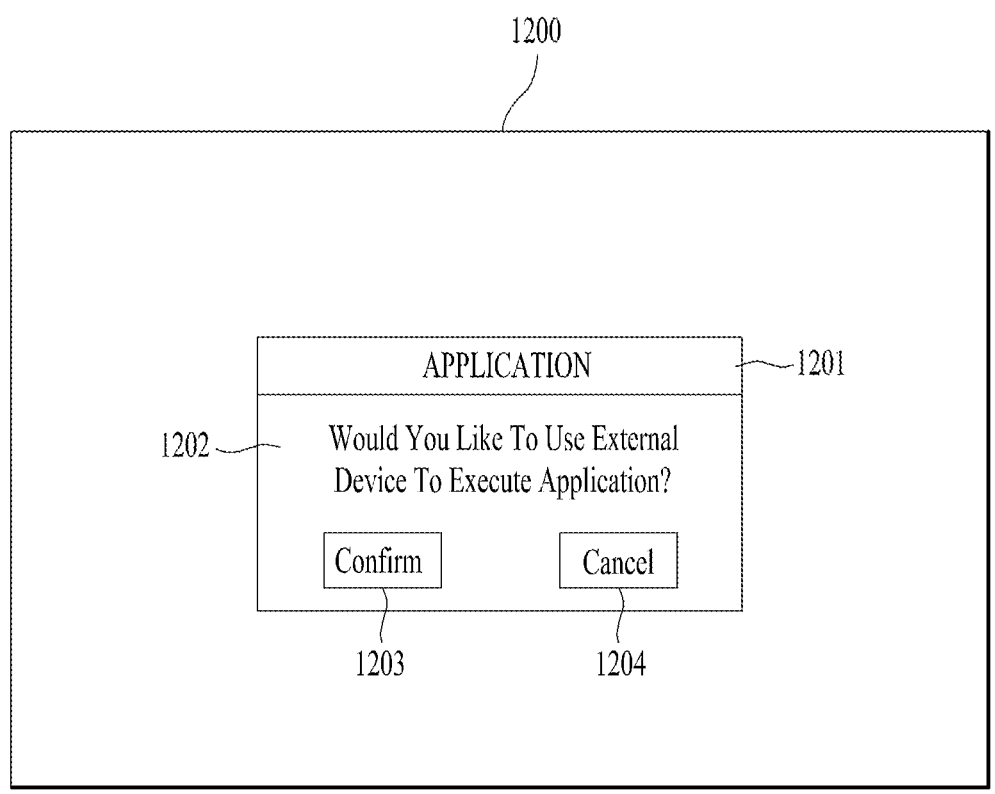
FIG. 16 shows a drawing of a display screen including a confirm menu using a device according to an embodiment of the present invention.

FIG. 16 is a drawing of a display screen 1200 including a confirmation menu for using the device according to an embodiment of the present invention.

According to an embodiment, the image display apparatus can display a selection menu 1201 receiving from the user a selection signal about whether an external device is to be connected to execute the application in the image display apparatus.

The selection menu 1201 can include an information message 1202, confirmation menu item 1203, and cancellation menu item 1204.

The information message 1202 can include information to help the user select. That is, it can include information about modules equipped in the image display apparatus, information about required modules to execute applications, and images or texts information about applications that specific modules demand.

Also, by inputting a selection signal of the confirmation menu item 1203, functions for device detection can be performed and by inputting a selection signal of the cancellation menu item 1204, the application can be performed only with modules equipped in the image display apparatus.

Figure 17:
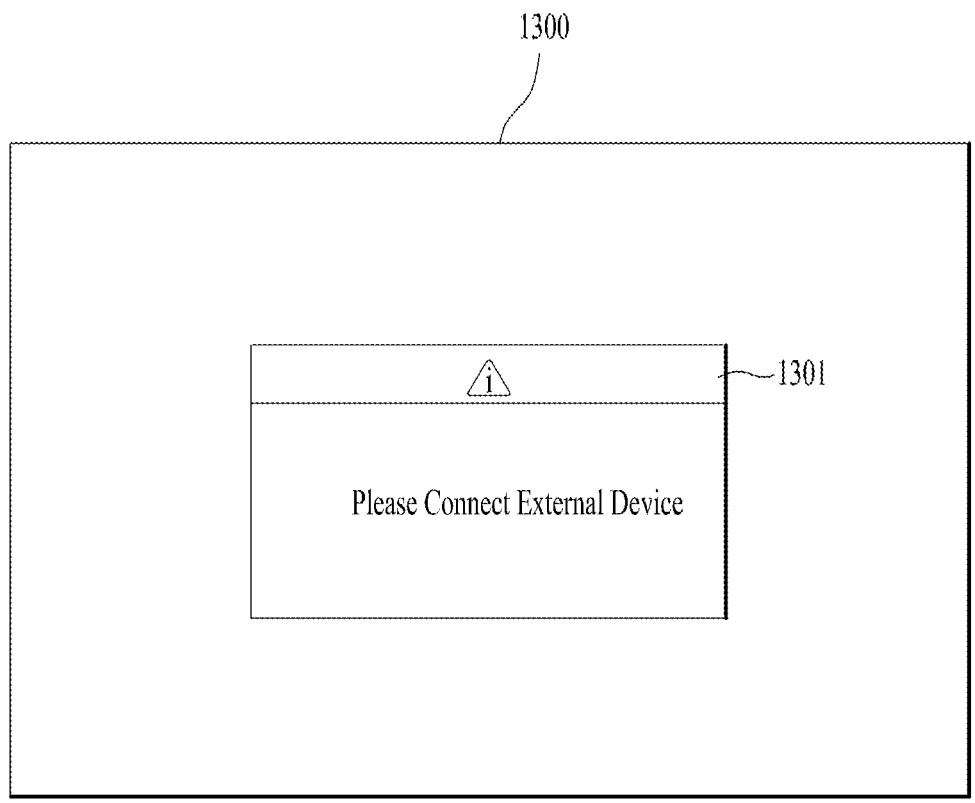
FIG. 17 shows a drawing of a display screen including a connecting device request message according to an embodiment of the present invention.

FIG. 17 is a drawing of a display screen 300 including the device connection request message according to an embodiment of the present invention.

According to an embodiment, an execution command of a specific application is received from the user, and in the case that a specific module for the execution of the specific application is not equipped in the image display apparatus, the image display apparatus can display the device connection request message 1301.

Also, according to another embodiment, the request message 1301 can be displayed in the case that connection between the image display apparatus and the specific device is malfunctioned while the image display apparatus is executing the specific application by transmitting/receiving data with the specific application.

The request message 1301 may include information about an executing application, information about a module required for the application, and texts or images information about a device having the required module.

Also, the request message can be automatically deleted when the device and the image display apparatus are connected.

As mentioned above, although the present invention is illustrated with limited embodiments and drawings, the present invention is not only limited to the embodiments and people ordinarily skilled in the art may modify and vary the limits of the present invention. Accordingly, the spirit of the present invention shall be analyzed within the scope of the appended claims, and it is intended that the present invention covers the modifications and variations of this invention provided they come within the scope of the appended claims and their equivalents.

MODE FOR INVENTION

It is illustrated in the aforementioned "Best Mode".

INDUSTRIAL APPLICABILITY

As mentioned above, since the embodiments of the present invention can be applied to display apparatuses, TVs, broadcast networks, and broadcast systems, its industrial applicability is acknowledged.

The invention claimed is:

1. A method of processing an application in an image display apparatus, the method comprising:
    displaying an application list on a display screen, the application list containing icon data representing each application and device data identifying each external device linked to said each application;
    receiving a first signal for selecting an application, which is executable using first application data from the displayed application list;
    detecting one or more external devices based on the device data included in the application list;
    transmitting a second signal for controlling a camera sensor of a corresponding external device in response to the first signal to collect the first application data and requesting the first application data acquired from the controlled camera sensor of the detected external device in response to the first signal;
    receiving the first application data from the detected external device in response to the second signal; and
    executing the selected application based on the received first application data and second application data, the second application data being stored in a memory of the image display apparatus,
    wherein the device data for the detected one or more external devices and the icon data linked to the device data are activated in the displayed application list.

2. The method of claim 1, further comprising:
    detecting a module for executing the application in the image display apparatus in response to the received first signal in the image display apparatus.

3. The method of claim 2, wherein the second signal further includes a device connection request message, and the method further comprises receiving a confirmation signal on being connected to the image display apparatus from the external device among the detected one or more external devices in response to the device connection request message include in the second signal.

4. The method of claim 1, wherein the first application data comprises execution information, which is collected in a module of the detected one or more external devices, related for executing the application in the image display apparatus.

5. The method of claim 1, further comprising:
    storing the device data on one or more external devices which comprise a module collecting the first application data for the application.

6. The method of claim 1, wherein the detected one or more external devices comprise a mobile terminal, a broadcast receiver, a personal computer (PC) and an air conditioner.

7. The method of claim 1, wherein the first application data is received from at least two detected external devices.

8. The method of claim 1, further comprising:
    setting the detected one or more external devices with a wired or wireless network connection,
    wherein the first application data is received through the set network connection, and
    wherein the network comprises a Local Area Network (LAN).

9. An image display apparatus comprising:
    a display unit configured to display an application list on a display screen, the application list containing icon data representing each application and device data identifying an external device linked to said each application;
    an interface unit configured to receive a first signal for selecting an application, which is executable using first application data from;
    an external device interface unit configured to transmit a second signal for controlling a camera sensor of a corresponding external device and requesting first application data acquired from the controlled camera sensor of the corresponding external device in response to the first signal, and to receive the first application data from the corresponding external device in response to the second signal;
    a memory configured to store second application data for the application; and
    a control unit configured to detect the one or more external devices based on the device data including in the application list and to execute the selected application based on the received first application data and the stored second application data,
    wherein the device data for the detected one or more external devices and the icon data linked to the device data are activated in the displayed application list.

10. The apparatus of claim 9, wherein the control unit detects a module for executing the application in the image display apparatus in response to the received first signal.

11. The apparatus of claim 10, wherein the external device interface unit transmits the second signal including a device connection request message to the detected one or more devices, and receives a confirmation signal on being connected to the image display apparatus from the external device among the detected one or more external devices in response to the device connection request message including the second signal.

12. The apparatus of claim 9, further comprising:
    the display unit further configured to output a user interface (UI); and
    the storage unit further configured to store the device data.

13. The apparatus of claim 9, wherein the detected one or more external devices comprise a mobile terminal, a broadcast receiver, a personal computer (PC) and an air conditioner.

14. The apparatus of claim 9, wherein the first application data is received from the detected at least two external devices.

15. The apparatus of claim 9, wherein the external device interface unit sets wired or wireless network connection with the detected one or more external devices, and receives the first application data through the set network connection, and wherein the network comprises a Local Area Network (LAN).

* * * * *